(12) United States Patent
Issa et al.

(10) Patent No.: US 8,359,192 B2
(45) Date of Patent: Jan. 22, 2013

(54) SYSTEM AND METHOD FOR INTERNET RADIO STATION PROGRAM DISCOVERY

(75) Inventors: Alfredo C. Issa, Apex, NC (US);
Richard J. Walsh, Raleigh, NC (US);
Christopher M. Amidon, Apex, NC (US)

(73) Assignee: Lemi Technology, LLC, Portsmouth, NH (US)

( * ) Notice: Subject to any disclaimer, the term of this patent is extended or adjusted under 35 U.S.C. 154(b) by 663 days.

(21) Appl. No.: 12/273,709

(22) Filed: Nov. 19, 2008

(65) Prior Publication Data
US 2010/0124892 A1 May 20, 2010

(51) Int. Cl.
*G06F 17/27* (2006.01)
(52) U.S. Cl. ....... 704/9; 704/3; 704/4; 704/10; 704/231; 704/251
(58) Field of Classification Search .................. 704/4, 9, 704/3, 231, 251, 10
See application file for complete search history.

(56) References Cited

U.S. PATENT DOCUMENTS

| | | | |
|---|---|---|---|
| 4,383,135 A | 5/1983 | Scott et al. |
| 4,682,370 A | 7/1987 | Matthews |
| 4,692,041 A | 9/1987 | Dyma et al. |
| 5,080,513 A | 1/1992 | Clary |
| 5,119,507 A | 6/1992 | Mankovitz |
| 5,274,567 A | 12/1993 | Kallin et al. |
| 5,430,698 A | 7/1995 | Nonaka et al. |
| 5,472,287 A | 12/1995 | Hasegawa et al. |
| 5,548,828 A | 8/1996 | Kozaki et al. |
| 5,564,037 A | 10/1996 | Lam |
| 5,579,537 A | 11/1996 | Takahisa |
| 5,594,601 A | 1/1997 | Mimick et al. |
| 5,654,719 A | 8/1997 | Kunii |
| 5,704,017 A | 12/1997 | Heckerman et al. |
| 5,757,939 A | 5/1998 | Begeja et al. |
| 5,790,754 A | 8/1998 | Mozer et al. |
| 5,812,937 A | 9/1998 | Takahisa et al. |
| 5,842,161 A | 11/1998 | Cohrs et al. |
| 5,864,753 A | 1/1999 | Morita et al. |
| 5,872,747 A | 2/1999 | Johnson |
| 5,898,910 A | 4/1999 | Miyake et al. |

(Continued)

FOREIGN PATENT DOCUMENTS

EP 0841180 A2 5/1998

(Continued)

OTHER PUBLICATIONS

Robert Ambrogi, "Full-text searching of podcasts," http://www.legaline.com/2006/01/full-text-searching-of-podcasts.html, Jan. 11, 2006, copyright 2002-2008 Robert J. Ambrogi, 2 pages.

(Continued)

*Primary Examiner* — Qi Han (57) ABSTRACT

An Internet radio station program discovery service is provided. In general, the discovery service subscribes to or downloads a number of Internet radio station programs. For each radio station program, the discovery service analyzes audio content of the radio station program to dynamically categorize the radio station program over time. The discovery service also enables users to discover radio station programs of interest based on the dynamic categorizations of the radio station programs. The users may be enabled to search for radio station programs of interest based on the dynamic categorizations of the radio station programs, navigate or browse the radio station programs based on the dynamic categorizations of the radio station programs, or the like.

17 Claims, 10 Drawing Sheets

U.S. PATENT DOCUMENTS

| | | | |
|---|---|---|---|
| 6,011,854 | A | 1/2000 | Van Ryzin |
| 6,021,320 | A | 2/2000 | Bickford et al. |
| 6,103,985 | A | 8/2000 | Shell et al. |
| 6,129,270 | A | 10/2000 | Piazza |
| 6,161,002 | A | 12/2000 | Migliaccio et al. |
| 6,173,165 | B1 | 1/2001 | Ruhl et al. |
| 6,175,537 | B1 | 1/2001 | Fleming, III |
| 6,203,223 | B1 | 3/2001 | Nakayama et al. |
| 6,240,280 | B1 | 5/2001 | Ravi et al. |
| 6,249,303 | B1 | 6/2001 | Mochizuki et al. |
| 6,257,783 | B1 | 7/2001 | Hanaoka et al. |
| 6,314,577 | B1 | 11/2001 | Pocock |
| 6,361,163 | B1 | 3/2002 | Fowlkes |
| 6,447,182 | B2 | 9/2002 | Brewington et al. |
| 6,484,141 | B1 | 11/2002 | Tomoeda |
| 6,704,553 | B1 | 3/2004 | Eubanks |
| 6,931,451 | B1* | 8/2005 | Logan et al. ............ 709/231 |
| 7,056,047 | B2 | 6/2006 | Sasaki et al. |
| 7,231,175 | B2 | 6/2007 | Ellis |
| 7,565,122 | B2 | 7/2009 | Eubanks |
| 2001/0016137 | A1 | 8/2001 | Omura |
| 2002/0062377 | A1 | 5/2002 | Hillman et al. |
| 2004/0157570 | A1 | 8/2004 | Eubanks |
| 2004/0260556 | A1* | 12/2004 | Hoffberg et al. ........ 704/270.1 |
| 2006/0067296 | A1 | 3/2006 | Bershad et al. |
| 2006/0143653 | A1 | 6/2006 | Suh |
| 2006/0182087 | A1 | 8/2006 | Deshpande |
| 2006/0190616 | A1 | 8/2006 | Mayerhofer et al. |
| 2006/0195462 | A1 | 8/2006 | Rogers |
| 2007/0044122 | A1 | 2/2007 | Scholl et al. |
| 2007/0299873 | A1 | 12/2007 | Jones et al. |
| 2008/0005699 | A1 | 1/2008 | Dvorak et al. |
| 2008/0021710 | A1 | 1/2008 | Ho |
| 2008/0133441 | A1 | 6/2008 | West et al. |
| 2008/0147711 | A1 | 6/2008 | Spiegelman et al. |
| 2008/0155616 | A1* | 6/2008 | Logan et al. ............. 725/93 |
| 2008/0194217 | A1 | 8/2008 | Eubanks |
| 2008/0300872 | A1* | 12/2008 | Basu et al. ............. 704/235 |
| 2009/0233563 | A1 | 9/2009 | Eubanks |
| 2010/0050064 | A1* | 2/2010 | Liu et al. .............. 715/202 |

FOREIGN PATENT DOCUMENTS

| | | |
|---|---|---|
| JP | 04-316157 A | 11/1992 |
| JP | 06-015893 A | 1/1994 |
| JP | 06-271167 A | 9/1994 |
| JP | 11-193159 A | 7/1999 |
| JP | 11-334121 A | 12/1999 |
| JP | 11-348364 A | 12/1999 |
| JP | 11-349203 A | 12/1999 |
| JP | 2000-280576 A | 10/2000 |
| JP | 2000-344428 A | 12/2000 |
| JP | 2001-063893 A | 3/2001 |
| JP | 2007-158925 A | 6/2007 |

OTHER PUBLICATIONS

"The Daily Mix on Blog Talk Radio," http://www.blogtalkradio.com/TheDailyMix, copyright 2009 BlogTalkRadio.com, printed Aug. 17, 2009, 3 pages.

David Chartier, "Cognition touts 'world's largest' semantic map of English," http://arstechnica.com/old/content/2008/09/cognition-touts-worlds-largest-semantic-map-o..., Sep. 17, 2008, printed Aug. 17, 2009, 2 pages.

"EveryZing, Inc—Video SEO and Multimedia Search Solutions—Technology," http://www.everyzing.com/technology, printed Aug. 17, 2009, 2 pages.

"Gaudi: Google Audio Indexing," http://labs.google.com/gaudi/static/faq.html, copyright 2009 Google, printed Aug. 17, 2009, 3 pages.

Olaf Noppens et al., "MOBIXPL—A SVG-Based Mobile User Interface for Semantic Service Discovery," http://www.svgopen.org/2007/papers/MobiXpl/index.html, printed Aug. 17, 2009, 15 pages.

"podscope," http://www.web.archive.org/web/20071123210837/http://www.podscope.com/, copyright 2006 TVEyes, printed Aug. 17, 2009, 1 page.

Abstract and Translation of Publication, Japanese Patent Publication No. 2007-158925, published Jun. 21, 2007, "Viewing Support System and Method Effectively Utilizing Recommended Program Information for Mobile Terminal, and Program Therefor," Japanese Patent Application No. 2005-353517, filed Dec. 7, 2005, Applicant: NEC CORP, Inventor: Beppu Yoshiyuki and Touchi Toshio, obtained from the Patent Abstracts of Japan (PAJ), 53 pages.

Forrest, B., "iLike, Recommending Music for Your iPod," Oct. 25, 2006, O'Reilly Radar, at <http://radar.oreilly.com/2006/10/ilike-recommending-music-for-y.html>, copyright O'Reilly Media, Inc., printed Apr. 19, 2011, 3 pages.

"Last.fm," at <http://en.wikipedia.org./wiki/Last.fm>, May 28, 2008, obtained from the Internet Archive, printed Apr. 19, 2011, 15 pages.

Lehmann-Haupt, Rachel, "Library/Internet Radio; Listeners Take on Role of the Deejay," The New York Times, at <http://www.nytimes.com/1998/11/05/technology/library-internet-radio-lis. . .>, Nov. 5, 1998, printed Oct. 13, 2009, 2 pages.

Lehmann-Haupt, Rachel, "Library/Internet Radio; On Spinner, Wide Range of Choices," The New York Times, at <http://www.nytimes.com/1998/11/05/technology/library-internet-radio-on-spinner-wide-range-of-choices.html?scp=1&sq=On. . .>, Nov. 5, 1998, printed Oct. 15, 2009, 5 pages.

Lehmann-Haupt, Rachel, "Library/Internet Radio; Web Radio Expands Listening Horizons," The New York Times, at <http://www.nytimes.com/1998/11/05/technology/library-internet-radio-web-radio-expands-listening-horizons.html?scp=2&sq=. . .>, Nov. 5, 1998, printed Oct. 15, 2009, 5 pages.

"Mercora—Music Search and Internet Radio Network," at <http://www.mercora.com/v6/_front/web.jsp>, printed Feb. 7, 2007, 1 page.

"Music Recommendations 1.0—MacUpdate," at <http://www.macupdate.com/info.php/id/19575>, printed Feb. 16, 2007, 1 page.

"Napster Licenses Relatable's New Commercial Release of TRM Acoustic Fingerprinting Technology," at <www.relatable.com>, printed Apr. 30, 2001, copyright 2000-2001, Relatable, 2 pages.

"Radio Shows What Your Friends Are Listening To," posted by Jonah Brucker-Cohen, May 5, 2008, at <http://blog.makezine.com/archive/2008/05/radio_shows_what_your_fri.html>, printed Apr. 19, 2011, 3 pages.

RSC Development Kit Manual, copyright 1996, Sensory, Inc., Aug. 1996, 303 pages.

"RSC-164: Recognition—Synthesis—Control," copyright 1996, Sensory, Inc., 9 pages.

"RSC-364: Recognition—Synthesis—Control," copyright 1999, Sensory, Inc., 8 pages.

"TRM: Advanced Audio Fingerprinting from Relatable," at <http://www.relatable/tech/trm.html>, copyright 2000-2001, Relatable, printed Apr. 30, 2001, 2 pages.

"Yahoo! Music," at <http://info.yahoo.com/privacy/ca/yahoo/music/>, Aug. 14, 2007, copyright 2007, Yahoo! Canada Co., obtained from the Internet Archive, printed Apr. 19, 2011, 4 pages.

"Zune Commnity Brings New Shared Experience to Music," Microsoft News Center, May 5, 2008, Redmond, Washington, at <http://www.microsoft.com/presspass/features/2008/may08/05-05zunesocial.mspx>, copyright Microsoft, printed Apr. 19, 2011, 4 pages.

* cited by examiner

SYSTEM AND METHOD FOR INTERNET RADIO STATION PROGRAM DISCOVERY

FIELD OF THE INVENTION

The present invention relates to the classification or categorization of Internet radio station programs.

BACKGROUND OF THE INVENTION

Through portals such as blogtalkradio.com and various other distribution sources, there are now thousands of Internet radio talk shows. Further, projections show that the number of Internet radio talk shows is expected to quickly rise. One issue resulting from the large number of Internet radio talk shows available is that users need a way to quickly and easily discover Internet radio talk shows of interest.

SUMMARY OF THE INVENTION

The present invention relates to an Internet radio station program discovery service. In general, the discovery service subscribes to or downloads a number of Internet radio station programs. For each radio station program, the discovery service analyzes audio content of the radio station program to dynamically categorize the radio station program over time. The discovery service also enables users to discover radio station programs of interest based on the dynamic categorizations of the radio station programs. The users may be enabled to search for radio station programs of interest based on the dynamic categorizations of the radio station programs, navigate or browse the radio station programs based on the dynamic categorizations of the radio station programs, or the like.

In one embodiment, in order to dynamically categorize each of the radio station programs, the discovery service performs speech-to-text conversion and natural language processing on the audio content of the radio station program to identify one or more topics of the radio station program. The discovery service then maps the one or more topics to an ontology or similar taxonomy describing relationships between a number of content classifiers in order to identify one or more content classifiers associated with the one or more topics of the radio station program. The identified content classifiers may then be scored. This process is repeated to continually process the audio content of the radio station program to dynamically categorize the radio station program.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
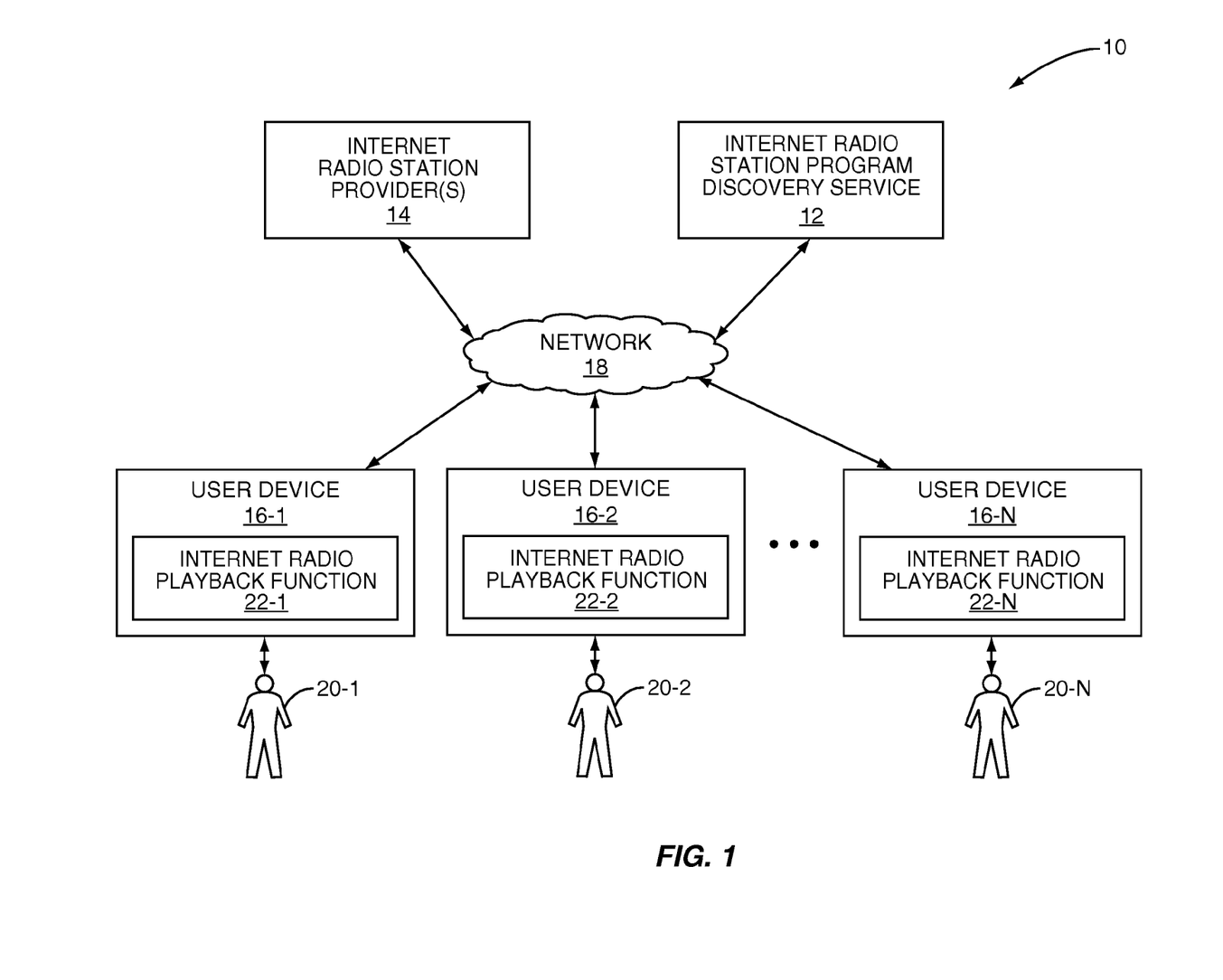
FIG. 1 illustrates a system including an Internet radio station program discovery service according to one embodiment of the present invention.

FIG. 1 illustrates a system 10 incorporating an Internet radio station program discovery service 12 (hereinafter "discovery service 12") according to one embodiment of the present invention. As illustrated, the system 10 includes the discovery service 12, one or more Internet radio station providers 14, and a number of user devices 16-1 through 16-N connected via a network 18. The network 18 may be any type of Wide Area Network (WAN), Local Area Network (LAN), or any combination thereof. Further, the network 18 may include wired components, wireless components, or both wired and wireless components. As an example, the network 18 may be a global network such as the Internet where each of the discovery service 12, the one or more Internet radio station providers 14, and the user devices 16-1 through 16-N have access to the network 18 via a wired connection, a local wireless connection (e.g., IEEE 802.11x, Bluetooth, or the like), or a mobile telecommunications network connection (e.g., Wideband Code Division Multiple Access (W-CMDA), Global System for Mobile Communications (GSM), or the like). Lastly, the user devices 16-1 through 16-N have associated users 20-1 through 20-N.

As discussed below, the discovery service 12 operates to subscribe to or download a number of Internet radio station programs (hereinafter "radio station programs") provided by the one or more Internet radio station providers 14. For example, the radio station programs may be talk shows. The one or more Internet radio station providers 14 may be servers operated and maintained by one or more commercial entities such that the corresponding Internet radio stations are commercial radio stations, servers operated by individual users such that the corresponding Internet radio stations are personal radio stations, or the like. The discovery service 12 then dynamically categorizes the radio station programs over time. In addition, the discovery service 12 enables the users 20-1 through 20-N to discover radio station programs of interest based on the dynamic categorizations of the radio station programs.

Each of the user devices 16-1 through 16-N may be any type of user device enabled to provide playback of Internet radio station content such as, for example, a personal computer, a mobile smart phone, a portable media player having network capabilities, or the like. The user devices 16-1 through 16-N include Internet radio playback functions 22-1 through 22-N, respectively. The Internet radio playback functions 22-1 through 22-N may be implemented in software, hardware, or a combination thereof. The Internet radio playback functions 22-1 through 22-N enable the users 20-1 through 20-N to interact with the discovery service 12 in order to discover radio station programs of interest to the users 20-1 through 20-N. In addition, the Internet radio playback functions 22-1 through 22-N enable the users 20-1 through 20-N to listen to desired radio station programs discovered via the discovery service 12.

Figure 2:
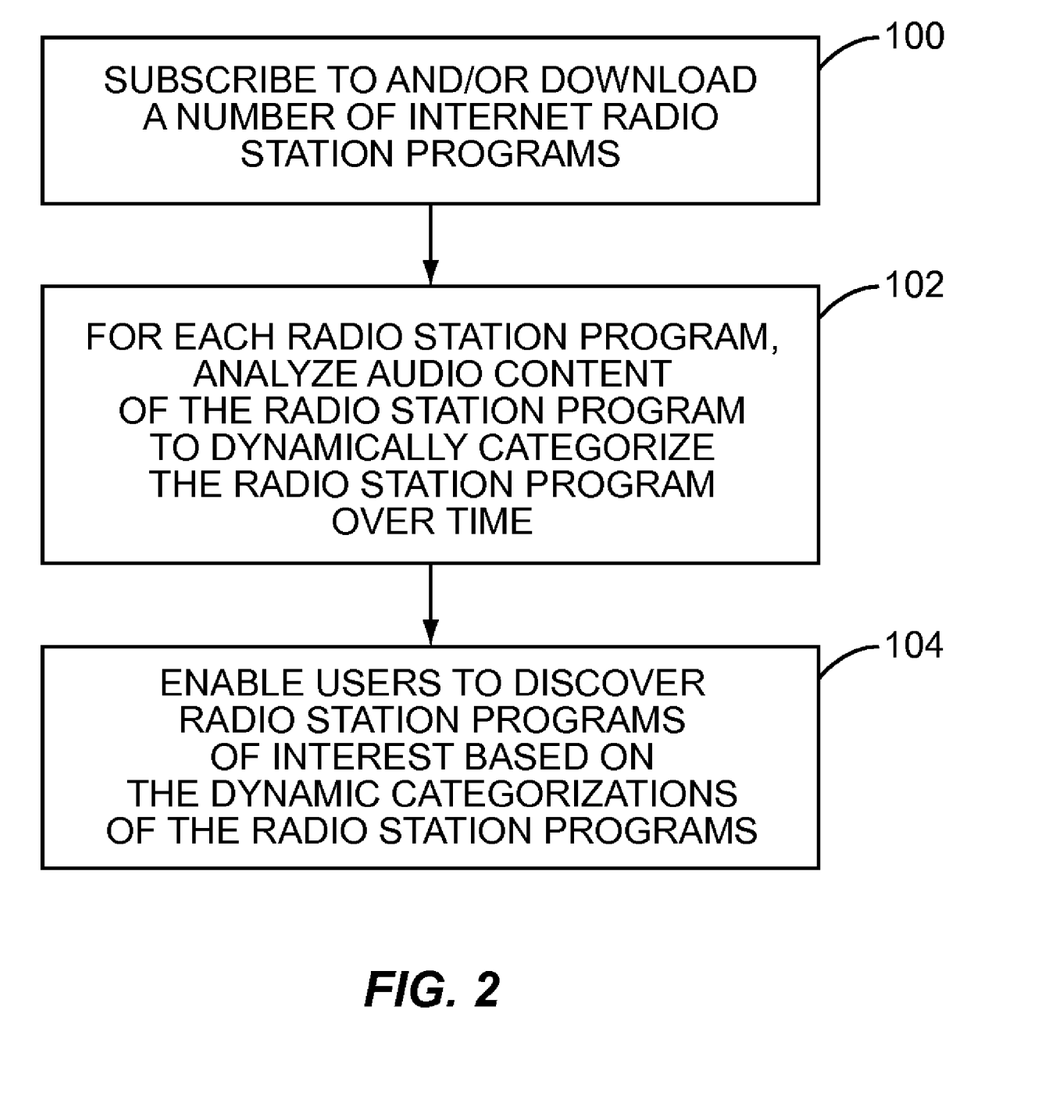
FIG. 2 is a flow chart illustrating operation of the Internet radio station program discovery service of FIG. 1 according to one embodiment of the present invention.

FIG. 2 is a flow chart illustrating operation of the discovery service 12 according to one embodiment of the present invention. First, the discovery service 12 subscribes to or downloads a number of radio station programs from the one or more Internet radio station providers 14 (step 100). In one embodiment, the Internet radio stations, and thus the radio station programs provided on the Internet radio stations, are received by the discovery service 12 via corresponding streaming audio channels. In another embodiment, the radio station programs are downloaded by the discovery service 12 as, for example, podcasts. In yet another embodiment, some radio station programs may be provided via corresponding streaming audio channels while other radio station programs may be downloaded as, for example, podcasts.

For each radio station program, the discovery service 12 analyzes audio content of the radio station program to dynamically categorize the radio station program over time (step 102). As discussed below, in the preferred embodiment, the discovery service 12 analyzes the audio content of the radio station program using speech-to-text conversion and natural language processing. However, in an alternative embodiment, tags identifying topics of the radio station program over time may be included in or provided in association with the radio station program. The tags may be inserted by, for example, the provider, by a community of users that have listened to the radio station program, or the like.

In addition, the discovery service 12 enables the users 20-1 through 20-N to discover radio station programs of interest based on the dynamic categorizations of the radio station programs (step 104). Note that the discovery service 12 may or may not complete analysis of the radio station programs before the users 20-1 through 20-N are enabled to discover radio station programs of interest. In one embodiment, using the user 20-1 as an example, the Internet radio playback function 22-1 of the user device 16-1 may enable the user 20-1 to enter one or more search terms. In response, the Internet radio playback function 22-1 may query the discovery service 12 for radio station programs having content classifiers matching the one or more search terms. In another embodiment, the user 20-1 may interact with the discovery service 12 via the Internet radio playback function 22-1 to navigate or browse a catalog or index of content classifiers. Then, upon selecting a desired content classifier, the user 20-1 may be presented with a list of radio station programs associated with the desired content classifier.

Figure 3:
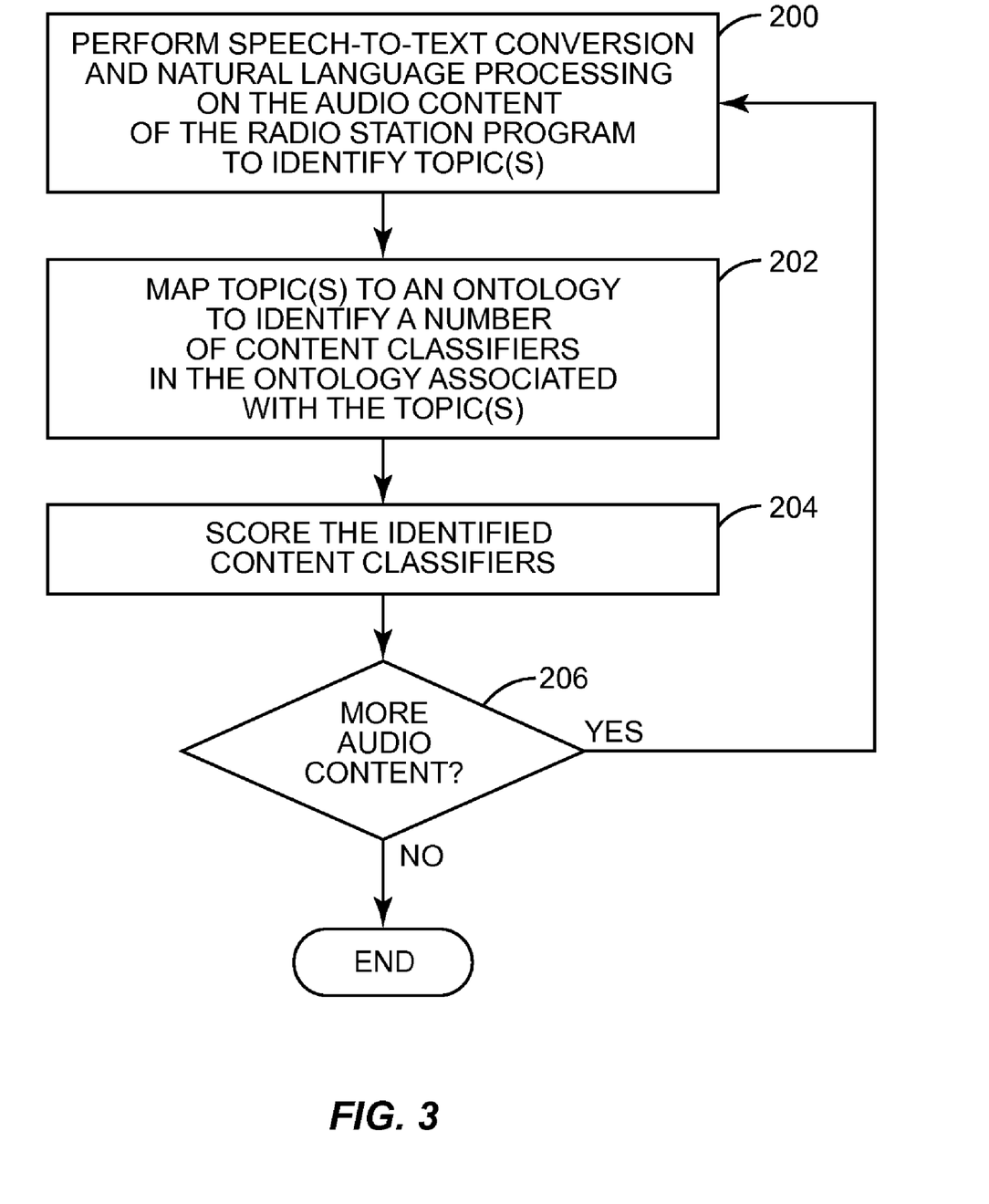
FIG. 3 is a flow chart illustrating a process for dynamically categorizing an Internet radio station program according to one embodiment of the present invention.

FIG. 3 is a flow chart illustrating a process for dynamically categorizing one of the radio station programs of FIG. 2 according to one embodiment of the present invention. First, the discovery service 12 performs speech-to-text conversion and natural language processing on audio content of the radio station program to identify one or more topics discussed in the radio station program (step 200). Note that as used herein speech-to-text conversion includes, but is not limited to, traditional speech-to-text conversion via word recognition, speech-to-text conversion by first converting speech into phonemes using a technique such as that used by Nexidia and then converting the phonemes into text, or the like. Also note that if the radio station program is received via a streaming audio channel, the discovery service 12 may buffer the audio content of the radio station program and perform speech-to-text conversion and natural language processing on the audio content of the buffered radio station program. In one embodiment, bookmarks or markers may be created and stored for the identified topics. The bookmarks may be implemented as time offsets from the beginning of the radio station program. Alternatively, if the audio content of the radio station program is buffered by the discovery service 12, the bookmarks may be implemented as pointers or references to locations within a buffer storing the buffered audio content.

Next, the discovery service 12 maps the one or more topics to an ontology or similar taxonomy of content classifiers to identify a number of content classifiers associated with the one or more topics (step 202). More specifically, in one embodiment, each content classifier in the ontology is associated with one or more keywords and/or descriptions. Then, for a particular topic, the discovery service 12 identifies the content classifiers in the ontology that have the topic listed as an associated keyword and/or for which the topic is included in the corresponding descriptions.

In one embodiment, an ontology mapping rights (OMR) file may be provided to the discovery service 12 in association with one or more of the radio station programs. In general, the OMR file for a radio station program may assist the discovery service 12 in the classification of the radio station program and/or restrict classification of the radio station program. More specifically, the OMR file for a radio station program may include information explicitly identifying permissible content classifiers from the ontology to which the topics identified for the radio station program may be mapped, information identifying non-permissible content classifiers from the ontology to which the topics for the radio station program may not be mapped, or both.

The OMR file may also include one or more sample voice clips to assist the discovery service 12 in the speech-to-text and natural language processing. The OMR file may also include information identifying one or more topics discussed in the radio station program and times at which the topics are discussed and/or information identifying references to content classifiers in the ontology and times at which the content classifiers are applicable to the radio station program. This may be done as an alternative to or in addition to the speech-to-text and natural language processing and mapping done by the discovery service 12. The OMR file may also include demographic information describing target users for the radio station program. The OMR file may include one or more buffer rules defining how long the discovery service 12 may buffer the audio content of the radio station program. Additionally, the OMR file may include a link to where an archive of the radio station program will be stored by the corresponding Internet radio station provider 14. This link may be provided to and used by the Internet radio playback functions 22-1 through 22-N if the users 20-1 through 20-N desire to listen to the radio station program after the radio station program has aired. Lastly, the OMR file may include metadata about the radio station program such as, for example, information about the radio station program, information about guests on the radio station program, or the like. This metadata may assist the discovery service 12 in the identification of topics and/or the mapping of topics to the ontology.

In this embodiment, once the content classifiers associated with the one or more topics are identified, the identified content classifiers are scored (step 204). For each of the identified content classifiers, the score of the content classifier may be a function of a relevance assigned to the one or more topics mapped to the content classifier. The relevance of a topic may be determined during speech-to-text conversion and natural language processing based on, for example, a density or frequency of that topic in the audio content of the radio station program, strength of the topic, speech metrics associated with the use of the topic or terms related to the topic in the audio content of the radio station program. As an example, speech metrics may be a volume of a speaker's voice, which may be described as shouting, yelling, normal, or whispering. In addition, the content classifiers may be scored as a function of the relative importance of each of the content classifiers in the ontology. The relative importance of each of the content classifiers in the ontology may be determined using, for example, PageRank or Eigenvector algorithms that determine "centrality" of nodes, or content classifiers, in the ontology. Note that any suitable scoring technique may be used to score the content classifiers such that the scores of the content classifiers are indicative of the relevance of the content classifiers to the radio station program. The exemplary scoring techniques discussed herein are not intended to limit the scope of the present invention.

Figure 4:
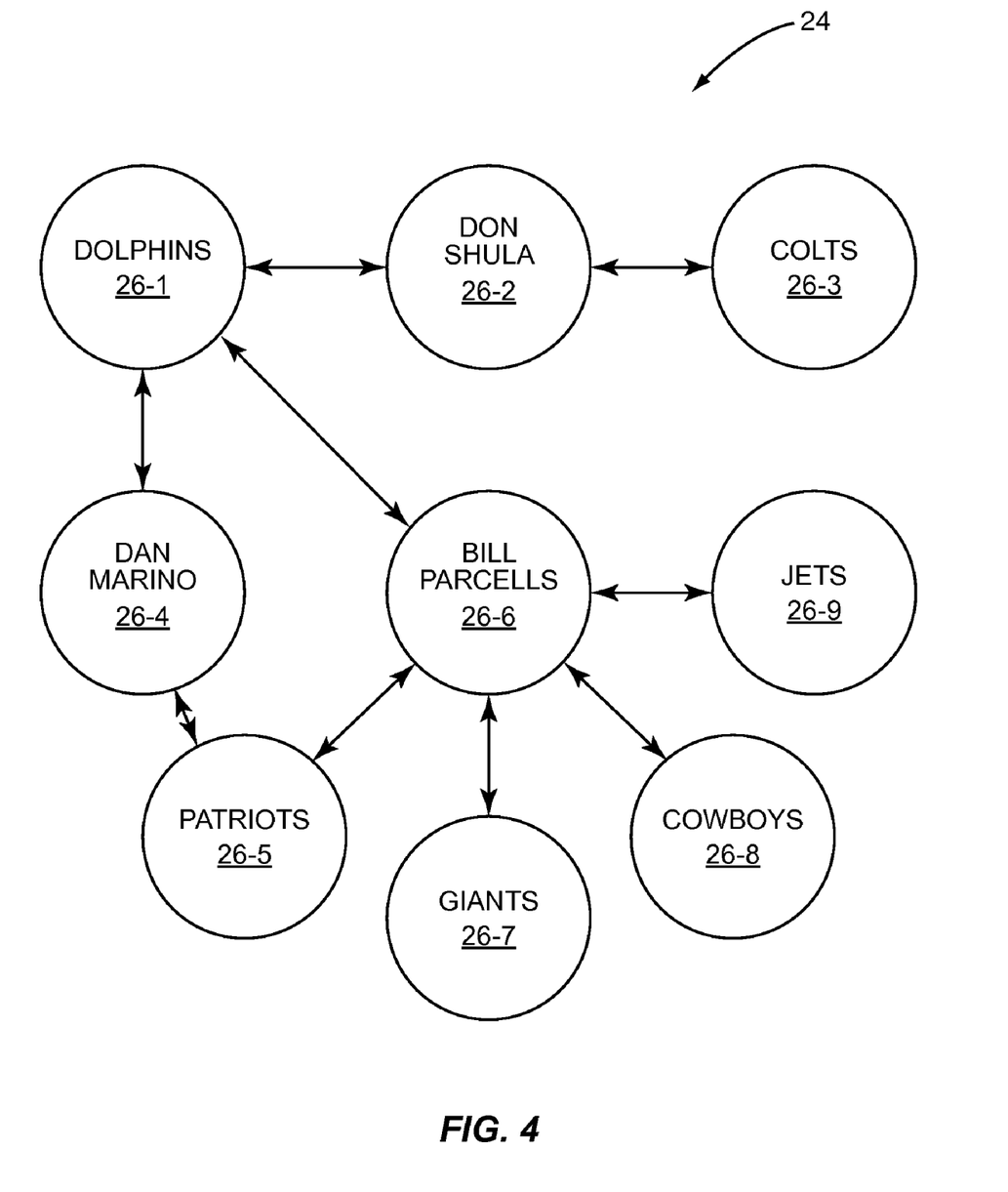
FIG. 4 illustrates an exemplary ontology of content classifiers.

FIGS. 4 through 7 graphically illustrate the process of FIGS. 2 and 3 according to an exemplary embodiment of the present invention. FIG. 4 illustrates an exemplary ontology 24, or at least a subset of an exemplary ontology 24, used to dynamically classify radio station programs. As illustrated, the ontology 24 defines relationships between a number of content classifiers 26-1 through 26-9, which are represented as nodes in the ontology 24. The ontology 24 may be created manually or based on an official ontology such as OpenCyc, which is an open source ontology maintained by Cycorp, Inc. In yet another embodiment, the ontology 24 may be generated by analyzing contents of a publicly available collection of knowledge such as Wikipedia. Using Wikipedia as an example, each Wikipedia page represents an ontological node where a title of the page is used as the corresponding content classifier. Therefore, each of the content classifiers 26-1 through 26-9 may correspond to a Wikipedia page. The Wikipedia pages are analyzed to discover relationships between the pages, and thus relationships between the content classifiers. For example, each Wikipedia page, and thus the corresponding content classifier, may be said to be related to all other Wikipedia pages that the Wikipedia page references, or to which the Wikipedia page has a link. Further, each Wikipedia page may be analyzed to identify one or more keywords associated with the corresponding content classifier and/or facts regarding the corresponding content classifier. Still further, on Wikipedia, each page is classified into one or more hierarchical categories. As such, each Wikipedia page may be analyzed to identify the categories for the corresponding content classifier. Further, a hierarchical list or index of categories may be obtained directly from Wikipedia or based on an analysis of the Wikipedia pages.

For this example, the ontology 24 includes the following information for each of the content classifiers 26-1 through 26-9.

TABLE 1

| Content Classifier | Dolphins |
|---|---|
| Relationships | Don Shula |
| | Bill Parcells |
| | Dan Marino |
| | ... |
| Keywords | Miami |
| | Football |
| | National Football League |
| | NFL |
| | Super Bowl VI |
| | Dan Marino |
| | Don Shula |
| | Fins |
| | ... |
| Facts | Lost Super Bowl VI to Dallas Cowboys |
| | Perfect season in 1972 |
| | Won Super Bowl VII |
| | Won Super Bowl VIII |
| | Coached by Don Shula from 1970-1995 |
| | ... |
| Categories | NFL Teams |
| | Sports in Miami, Florida |
| | ... |

TABLE 2

| Content Classifier | Don Shula |
|---|---|
| Relationships | Dolphins |
| | Colts |
| | ... |
| Keywords | Dolphins |
| | Head Coach |
| | Football |
| | National Football League |
| | NFL |
| | Super Bowl VII |
| | Super Bowl VIII |
| | Baltimore Colts |
| | Hall of Fame |
| | ... |
| Facts | Head Coach of Miami Dolphins from 1970-1995 |
| | Won Super Bowl VII |
| | Won Super Bowl VIII |
| | Coached Miami Dolphins to a perfect season in 1972 |
| | Inducted to Hall of Fame in 1997 |
| | ... |
| Categories | NFL Coaches |
| | Miami Dolphins Coaches |
| | Baltimore Colts Coaches |
| | NFL Hall of Fame |
| | ... |

TABLE 3

| Content Classifier | Colts |
|---|---|
| Relationships | Don Shula |
| | ... |
| Keywords | Baltimore |
| | Indianapolis |
| | Don Shula |
| | NFL |
| | Football |
| | Peyton Manning |
| | ... |
| Facts | Won five NFL championships including two Super Bowl titles |
| | Won Super Bowl XLI against the Chicago Bears |
| | Coached by Don Shula from 1963-1969 |
| | ... |
| Categories | NFL Teams |
| | ... |

TABLE 4

| Content Classifier | Dan Marino |
|---|---|
| Relationships | Dolphins |
| | Patriots |
| | ... |
| Keywords | Miami |
| | Dolphins |
| | Quarterback |
| | Football |
| | National Football League |
| | NFL |
| | Hall of Fame |
| | NutriSystem |
| | ... |
| Facts | Quarterback of the Miami Dolphins |
| | Spokesman for NutriSystem weight loss program |
| | Played against the New England Patriots on Oct. 11, 1996; final score 24-10 |
| | ... |
| Categories | NFL Quarterbacks |
| | Miami Dolphins Players |
| | NFL Hall of Fame |
| | ... |

TABLE 5

| Content Classifier | Patriots |
|---|---|
| Relationships | Dan Marino |
| | Bill Parcells |
| | ... |
| Keywords | Pats |
| | New England |
| | Boston |
| | Football |
| | National Football League |
| | NFL |
| | Super Bowl XX |
| | Super Bowl XXXI |
| | Super Bowl XXXVI |
| | Super Bowl XXXVIII |
| | Super Bowl XXXIX |
| | Tom Brady |
| | Bill Parcells |
| | ... |

TABLE 5-continued

| Content Classifier | Patriots |
|---|---|
| Facts | Won Super Bowls XXXVI, XXXVIII, and XXXIX |
| | Lost Super Bowls XX and XXXI |
| | Coached by Bill Parcells from 1993-1996 |
| | ... |
| Categories | NFL Teams |
| | Sports in Boston, Massachusetts |
| | ... |

TABLE 6

| Content Classifier | Bill Parcells |
|---|---|
| Relationships | Dolphins |
| | Patriots |
| | Giants |
| | Cowboys |
| | Jets |
| | ... |
| Keywords | Football |
| | National Football League |
| | NFL |
| | Head Coach |
| | Patriots |
| | Giants |
| | Cowboys |
| | Jets |
| | Executive VP of Football Operations |
| | Dolphins |
| | ... |
| Facts | Coached New York Giants from 1983-1990 |
| | Coached New England Patriots from 1993-1996 |
| | Coached New York Jets from 1997-1999 |
| | Coached Dallas Cowboys from 2003-2006 |
| | Executive Vice President of Football Operations for Miami Dolphins from 2008-present |
| | ... |
| Categories | NFL Head Coaches |
| | Giants Head Coaches |
| | ... |

TABLE 7

| Content Classifier | Giants |
|---|---|
| Relationships | Bill Parcells |
| | ... |
| Keywords | New York |
| | Football |
| | National Football League |
| | NFL |
| | Bill Parcells |
| | Super Bowl XXI |
| | ... |
| Facts | NFL team in New York |
| | Coached by Bill Parcells from 1983-1990 |
| | ... |
| Categories | NFL Teams |
| | ... |

TABLE 8

| Content Classifier | Cowboys |
| --- | --- |
| Relationships | Bill Parcells |
|  | ... |
| Keywords | Dallas |
|  | Football |
|  | National Football League |
|  | NFL |
|  | Bill Parcells |
|  | ... |
| Facts | NFL team in Dallas, Texas |
|  | Coached by Bill Parcells from 2003-2006 |
|  | ... |
| Categories | NFL Teams |
|  | ... |

TABLE 9

| Content Classifier | Jets |
| --- | --- |
| Relationships | Bill Parcells |
|  | ... |
| Keywords | New York |
|  | Football |
|  | National Football League |
|  | NFL |
|  | Bill Parcells |
|  | ... |
| Facts | NFL team in New York |
|  | Coached by Bill Parcells from 1997-1999 |
|  | ... |
| Categories | NFL Teams |
|  | ... |

Figure 5:
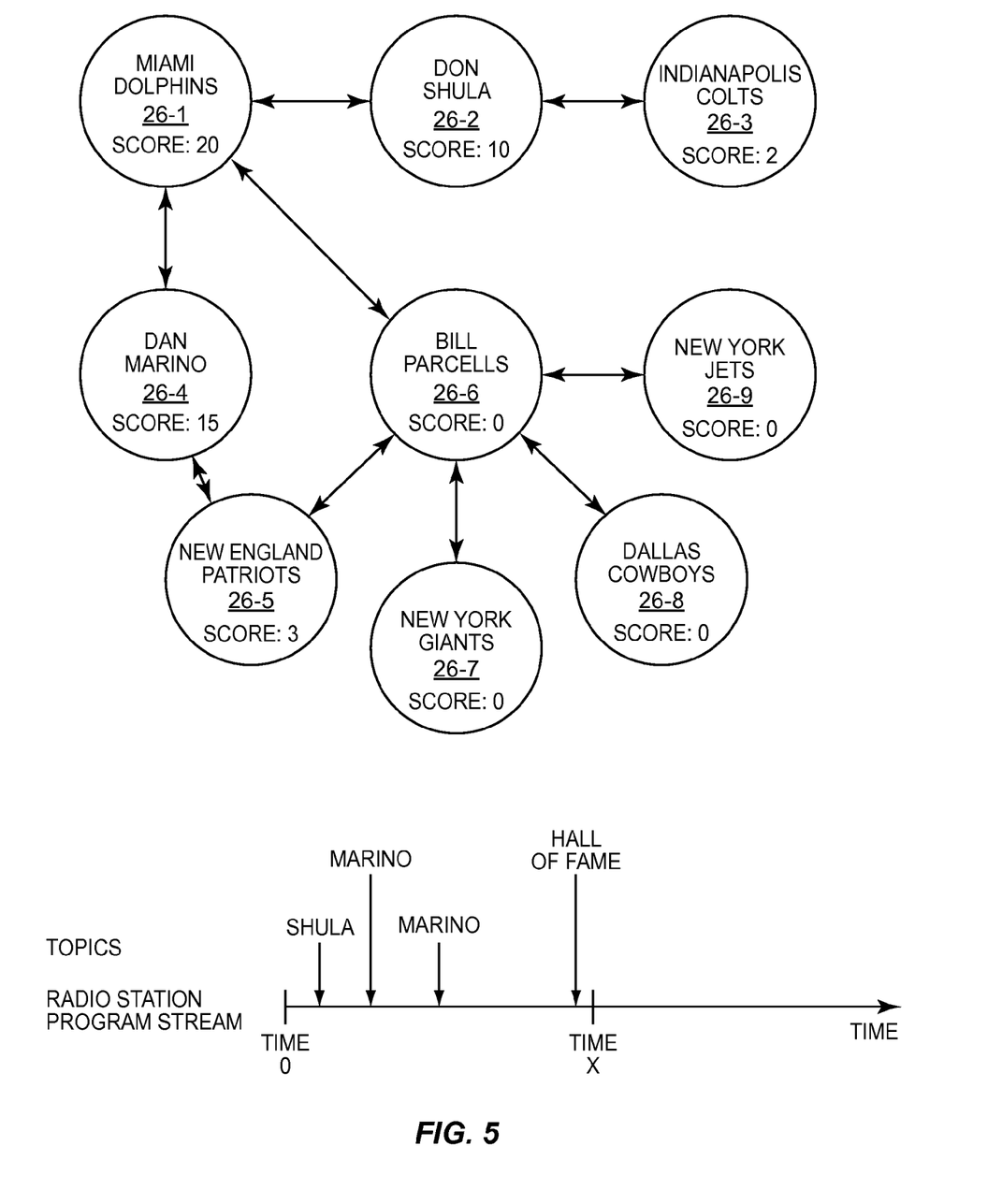
FIGS. 5 and 6 graphically illustrate dynamic identification of topics of an Internet radio station program and mapping of the topics to the ontology of FIG. 4 according to one embodiment of the present invention.
Figure 6:
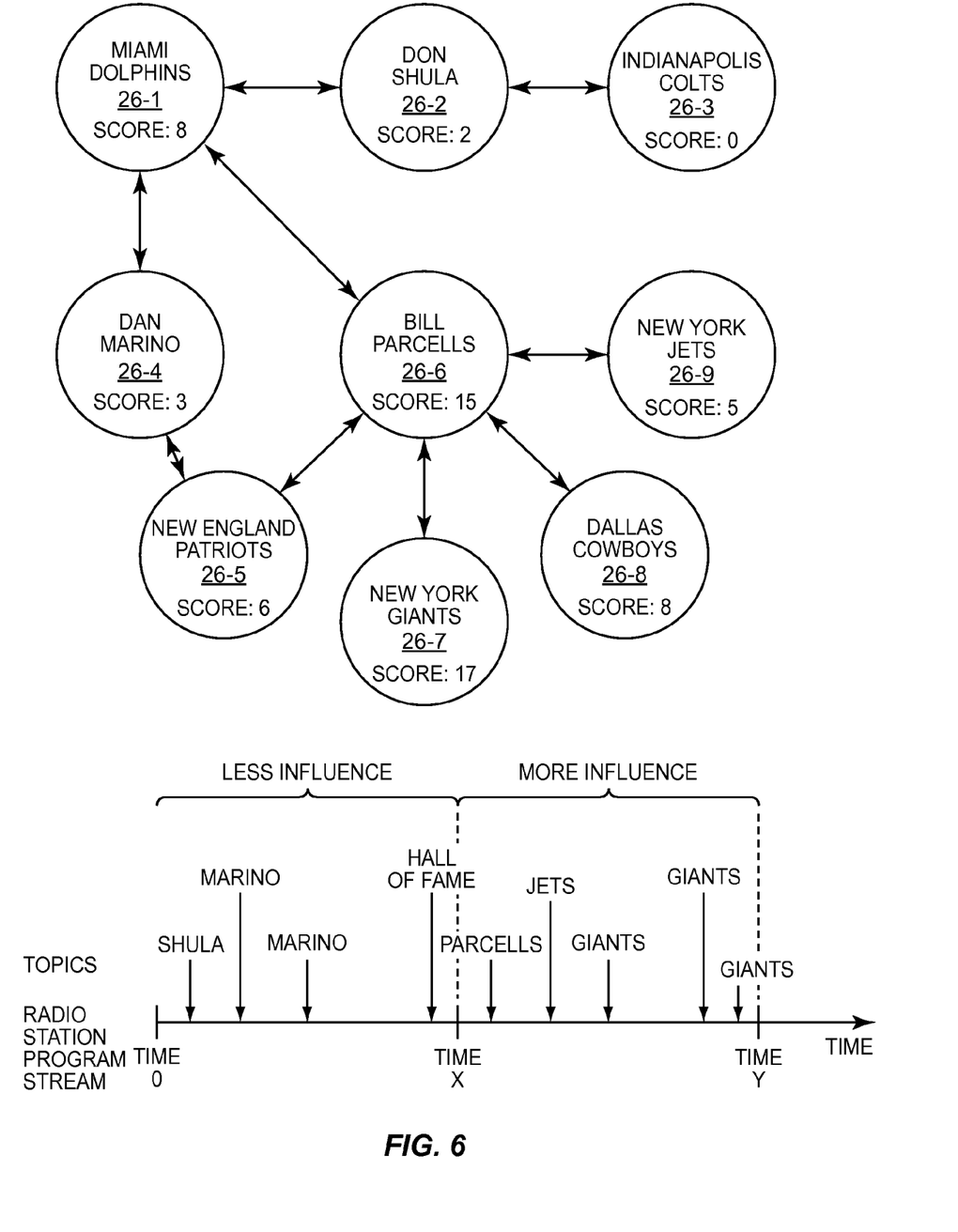

FIGS. 5 and 6 graphically illustrate the dynamic categorization of an exemplary radio station program according to one embodiment of the present invention. FIG. 5 illustrates the identification of topics during a first time segment of the audio content of the radio station program, the mapping of the identified topics to the ontology 24, and the scoring of the associated content classifiers in the ontology 24 according to one embodiment of the present invention. More specifically, during a first time segment of the radio station program from TIME 0 to TIME X, the audio content of the radio station program is analyzed by the discovery service 12 to identify the topics "Shula," "Marino," and "Hall of Fame." The topic "Shula" is mapped to the content classifier 26-1 ("Dolphins") because "Don Shula" is a keyword associated with the content classifier 26-1 and/or because "Shula" is mentioned in one of the facts associated with the content classifier 26-1. Likewise, the topic "Shula" is mapped to the content classifier 26-2 ("Don Shula") because "Shula" is found in the title of the content classifier 26-2. Additionally, the topic "Shula" is mapped to the content classifier 26-3 ("Colts"). In a similar manner, the topic "Marino" is mapped to the content classifier 26-1 ("Dolphins"), the content classifier 26-4 ("Dan Marino"), and the content classifier 26-5 ("Patriots"). Lastly, the topic "Hall of Fame" is mapped to the content classifier 26-2 ("Don Shula") and the content classifier 26-4 ("Dan Marino").

The content classifiers 26-1, 26-2, 26-3, 26-4, and 26-5 to which the topics "Shula," "Marino," and "Hall of Fame" are mapped and scored. In one embodiment, each of the content classifiers 26-1, 26-2, 26-3, 26-4, and 26-5 is scored based on the relevance of each of the topics that is mapped to that content classifier. In addition or alternatively, the content classifiers 26-1, 26-2, 26-3, 26-4, and 26-5 may be scored based on the degree to which the categories of the content classifiers 26-1, 26-2, 26-3, 26-4, and 26-5 overlap. More specifically, using the content classifier 26-1 as an example, the content classifier 26-1 may be scored based on the degree to which the categories for the content classifier 26-1 overlap with the categories for the other content classifiers 26-2, 26-3, 26-4, 26-5, and 26-6. Therefore, for example, if the content classifier 26-1 is in category A (not shown), then the score of the content classifier 26-1 may be incremented by +0.1 points for each of the other content classifiers 26-2, 26-3, 26-4, and 26-5 that is also in category A. Further, if there is one degree of separation between category A and category B (not shown), then the score of the content classifier 26-1 may be incremented by +0.05 points for each of the other content classifiers 26-2, 26-3, 26-4, and 26-5 that is in category B. Further, if there are two degrees of separation between category A and category C (not shown), then the score of the content classifier 26-1 may be incremented by +0.033 points for each of the other content classifiers 26-2, 26-3, 26-4, and 26-5 that is in category C. This may continue for any number of degrees of separation. The maximum number of degrees of separation that is considered may be system defined or user-configurable.

Next, as additional audio content of the radio station program is processed and analyzed by the discovery service 12, additional topics are identified and mapped to the ontology 24. More specifically, as illustrated in FIG. 6, from TIME X to TIME Y, the corresponding audio content of the radio station program is analyzed to identify the topics "Parcells," "Jets," and "Giants." The discovery service 12 then maps the identified topics to the ontology 24 in order to identify one or more of the content classifiers 26-1 through 26-9 that are associated with the identified topics. The scores for the identified content classifiers are then updated. Note that the topics identified in TIME 0 through TIME X may still influence the scores for the content classifiers but be given less influence or less weight than the topics identified in TIME X to TIME Y.

Figure 7:
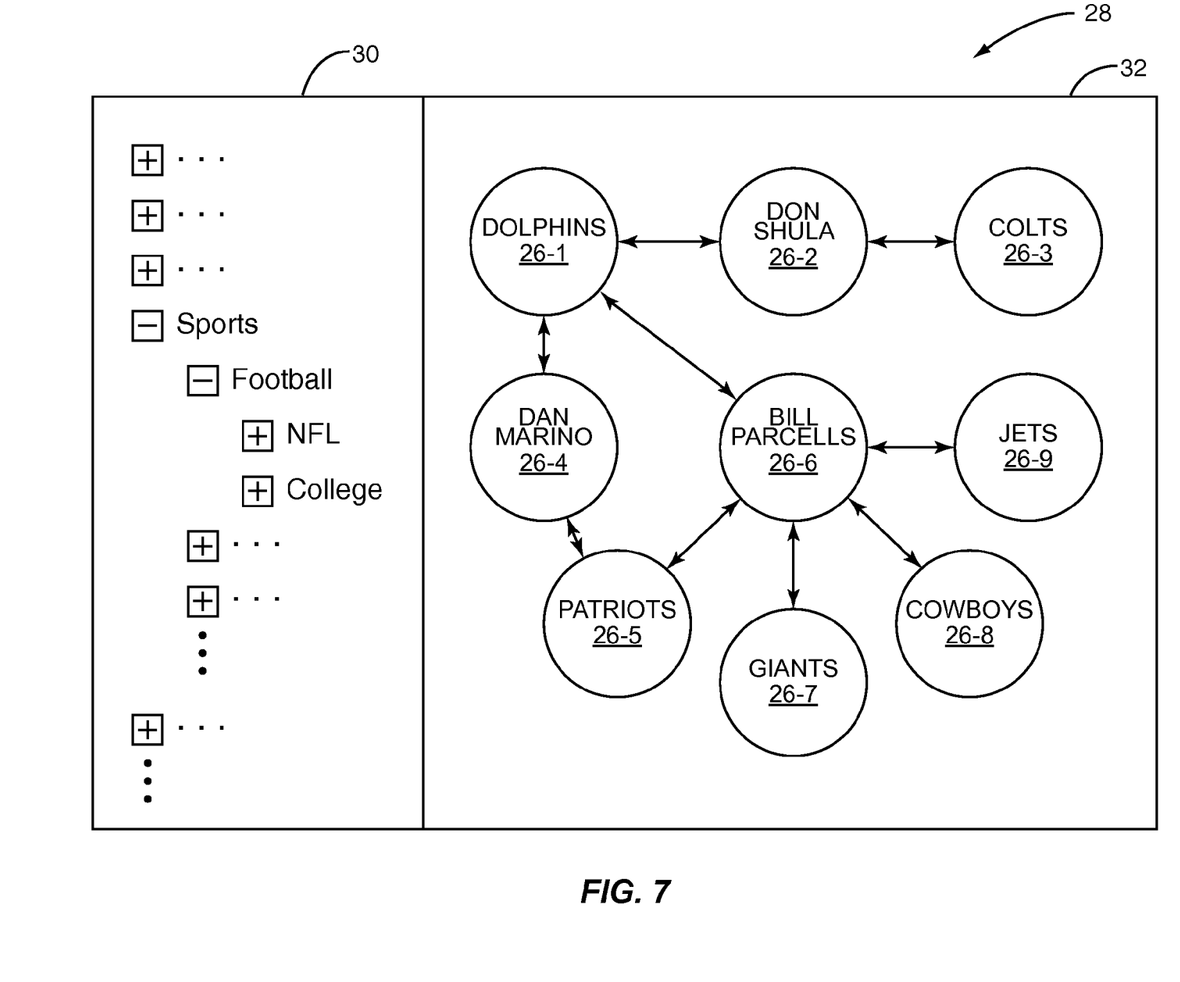
FIGS. 7 and 8 are exemplary Graphical User Interfaces (GUIs) through which a user is enabled to discover Internet radio stations of interest according to one embodiment of the preset invention.

FIG. 7 illustrates an exemplary Graphical User Interface (GUI) 28 enabling a user, such as for example the user 20-1, to interact with the discovery service 12 to discover radio station programs of interest according to one embodiment of the present invention. The GUI 28 may be provided by the discovery service 12 and presented to the user 20-1 via the Internet radio playback function 22-1 or provided by the Internet radio playback function 22-1 as an interface to the discovery service 12. The GUI 28 includes a navigation area 30 and an ontology display area 32. The navigation area 30 is optional and may be desirable where, for example, the ontology 24 is large. In this example, the navigation area 30 presents a hierarchical index or list of categories, and the content classifiers in the ontology 24 are categorized into the categories. In operation, the user 20-1 selects a category of interest, which in this example is an "NFL" category. Note that the NFL category may have a number of sub-categories which may include "NFL Teams," "NFL Head Coaches," "NFL Quarterbacks," and the like. In response to the user 20-1 selecting the NFL category, a filtered version of the ontology 24 including only those nodes in the NFL category or one of the sub-categories of the NFL category are displayed in the ontology display area 32. The user 20-1 may then select a desired one of the content classifiers 26-1 through 26-9 in the ontology display area 32.

Figure 8:
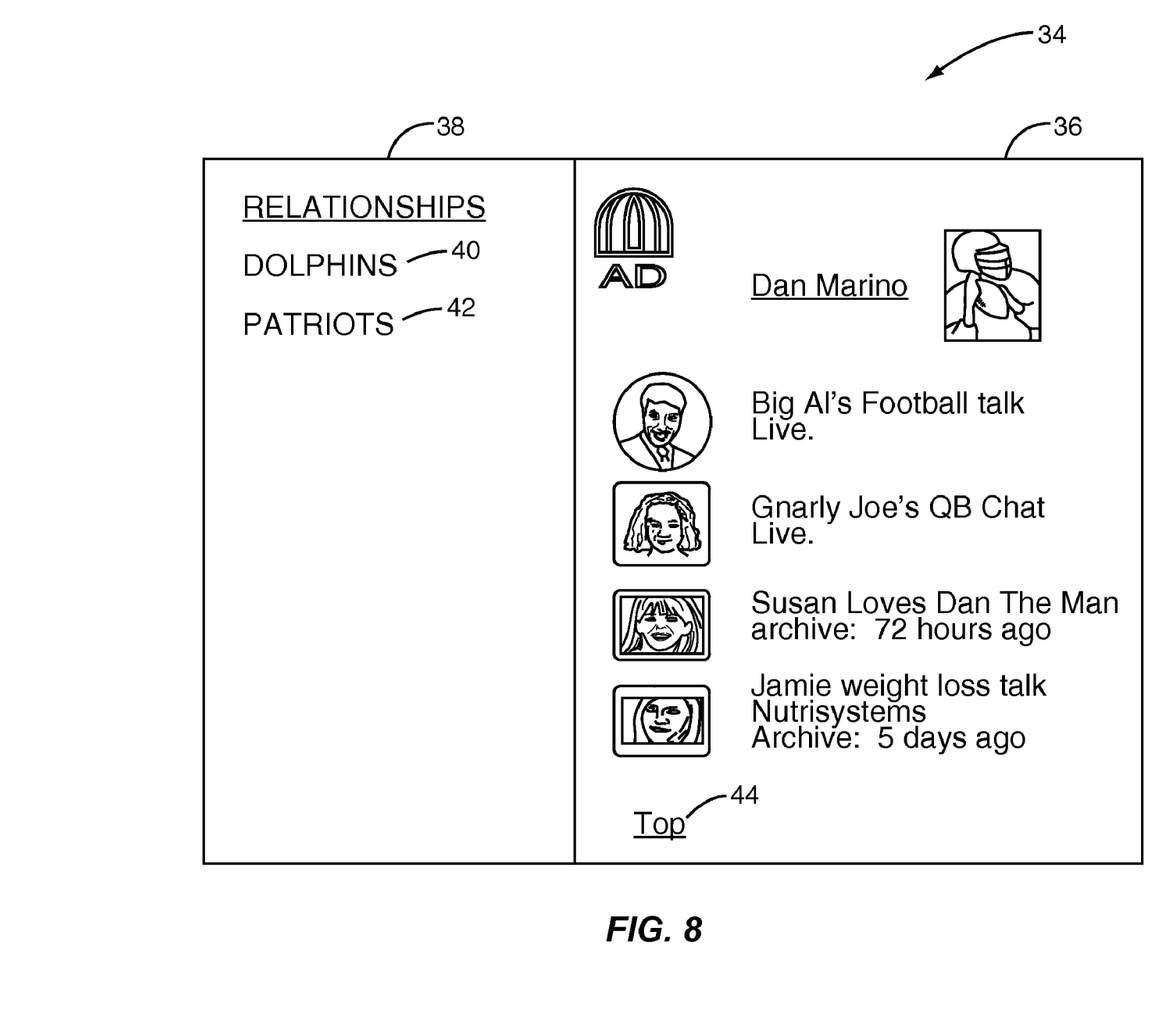

In this example, the user 20-1 selects the content classifier 26-4 ("Dan Marino"). In response, as illustrated in FIG. 8, a GUI 34 is presented to the user 20-1. The GUI 34 includes a radio station program display area 36 and a relationships area 38. The radio station program display area 36 presents a list of radio station programs that are associated with the Dan Marino content classifier 26-4. In addition, the list of radio station programs may be prioritized based on relevance to the Dan Marino content classifier 26-4. In one embodiment, the relevance of the radio station programs to the Dan Marino content classifier 26-4 corresponds to the scores for the Dan Marino content classifier 26-4 generated by the discovery service 12 for the radio station programs. More specifically, as discussed above, for each of these radio station programs, one or more topics for the radio station program were dynamically identified and mapped to the Dan Marino content classifier 26-4. The resulting scores for the Dan Marino content classifier 26-4 for these radio station programs may then be used to prioritize the radio station programs in the radio station program display area 36. In addition or alternatively, the radio station programs in the radio station program display area 36 may be prioritized based on whether or not the radio station programs are currently airing or are live. Still further, the radio station programs in the radio station program display area 36 may additionally or alternatively be prioritized based on the demographic information describing target users provided in an OMR file for the radio station program as compared to demographic information describing the user 20-1. As such, radio station programs for which the user 20-1 is a target user may be given a higher priority in the radio station program display area 36. Note that other preferences of the user 20-1 may additionally or alternatively be used to prioritize the radio station programs in the radio station program display area 36.

The relationships area 38 enables the user 20-1 to navigate to nodes in the ontology 24 that are related to the current node, which in this example is the Dan Marino content classifier 26-4. As such, the user 20-1 may navigate to the Dolphins content classifier 26-1 by selecting a corresponding indicator 40 or navigate to the Patriots content classifier 26-5 by selecting a corresponding indictor 42. The user 20-1 may return to the GUI 28 (FIG. 7) by selecting a "Top" indicator 44.

If the user 20-1 desires to play one of the radio station programs listed in the radio station program display area 36, the user 20-1 selects the desired radio station program. For example, assume that the user 20-1 selects "Big Al's Football talk." In response, the Internet radio playback function 22-1 of the user device 16-1 of the user 20-1 sends a request to the Internet radio station provider 14 for "Big Al's Football talk," and playback begins. Note that a reference to "Big Al's Football talk," such as a Uniform Resource Locator (URL), may be provided to the Internet radio playback function 22-1 in advance or may be requested from the discovery service 12 as needed. In an alternative embodiment, "Big Al's Football talk" may be delivered to the Internet radio playback function 22-1 of the user 20-1 via the discovery service 12.

Figure 9:
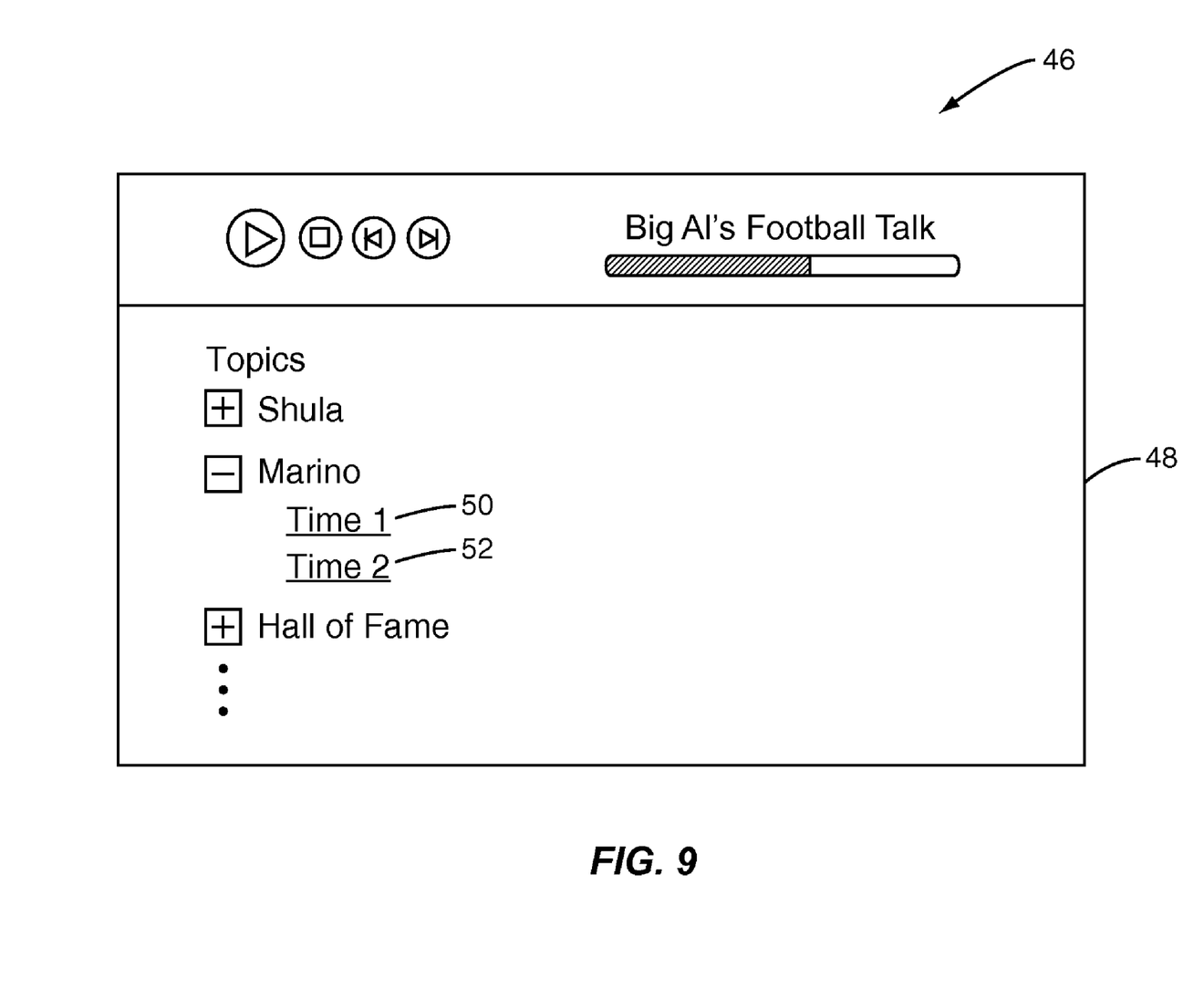
FIG. 9 is an exemplary GUI of an Internet radio station playback function of a user device of a user including an index or list of topics discussed in an Internet radio station program being played according to one embodiment of the present invention.

In one embodiment, for each radio station program, an index or list of topics discussed in the radio station program is maintained. Further, for each topic, one or more bookmarks to segments of the radio station program during which the topic is discussed may also be maintained. FIG. 9 illustrates an exemplary GUI 46 of the Internet radio playback function 22-1 of the user device 16-1 of the user 20-1 after the user 20-1 has selected "Big Al's Football talk" for playback. As illustrated, the GUI 46 includes a topic display area 48 including a list of topics identified for "Big Al's Football talk" by the discovery service 12. For each topic, a number of bookmarks indentify times at which the topic is discussed. Thus, in this example, the topic "Marino" has two bookmarks 50 and 52. The bookmark 50 identifies a time (Time 1) corresponding to the beginning of a segment of the radio station program during which the topic "Marino" was discussed. Similarly, the bookmark 52 identifies a time (Time 2) corresponding to the beginning of another segment of the radio station program during which the topic "Marino" was discussed. By selecting the bookmark 50, playback of "Big Al's Football talk" jumps to the corresponding time (Time 1) in playback of "Big Al's Football talk." Likewise, by selecting the bookmark 52, playback of "Big Al's Football talk" jumps to the corresponding time (Time 2) in playback of "Big Al's Football talk."

Figure 10:
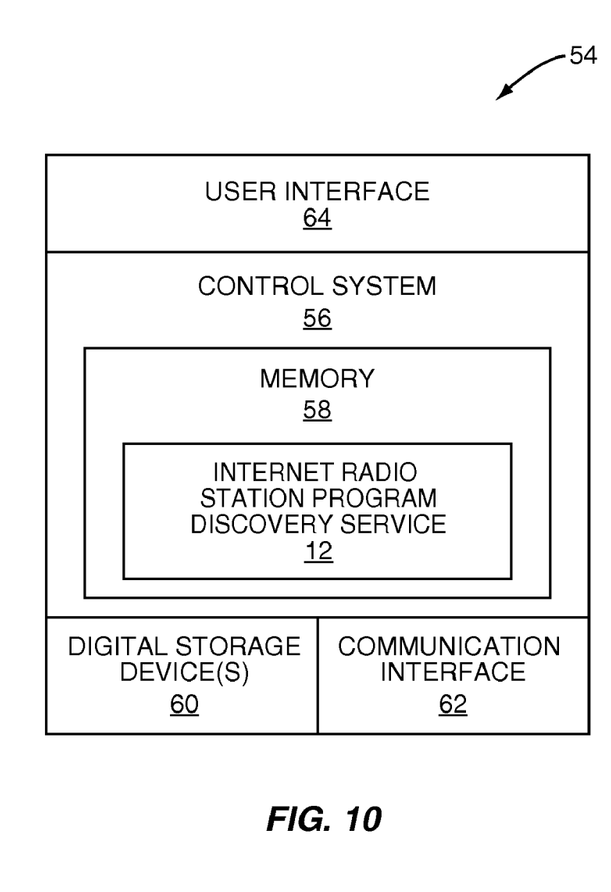
FIG. 10 is a block diagram of a server hosting the Internet radio station program discovery service of FIG. 1 according to one embodiment of the present invention.

FIG. 10 is a block diagram of server 54 hosting the discovery service 12 according to one embodiment of the present invention. In general, the server 54 includes a control system 56 having associated memory 58. In this embodiment, the discovery service 12 is implemented in software and stored in the memory 58. However, the present invention is not limited thereto. The discovery service 12 may be implemented in software, hardware, or a combination thereof. The server 54 also includes one or more digital storage devices 60, at least one communication interface 62 communicatively coupling the server 54 to the one or more Internet radio station providers 14 and the user devices 16-1 through 16-N (FIG. 1), and a user interface 64, which may include components such as, for example, a display, one or more user input devices, or the like.

Note that the server 54 is exemplary. The discovery service 12 may be implemented on a single server or distributed over a number of servers. Further, in another embodiment, the discovery service 12 may be distributed over a number of user devices such as, but not limited to, the user devices 16-1 through 16-N. For example, each of the user devices 16-1 through 16-N may be responsible for dynamically categorizing one or more radio station programs.

Figure 11:
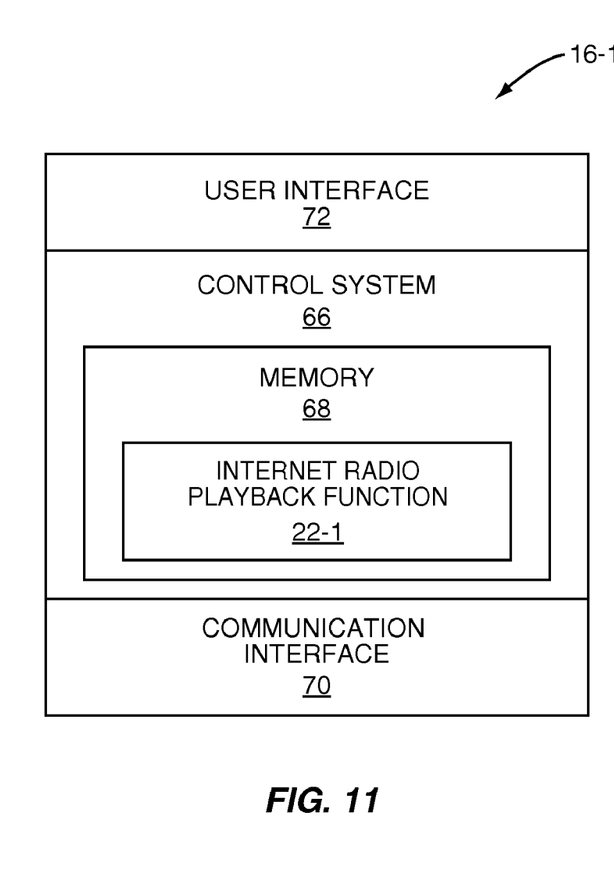
FIG. 11 is a block diagram of one of the user devices of FIG. 1 according to one embodiment of the present invention.

FIG. 11 is a block diagram of the user device 16-1 according to one embodiment of the present invention. This discussion is equally applicable to the other user devices 16-2 through 16-N. In general, the user device 16-1 includes a control system 66 having associated memory 68. In this embodiment, the Internet radio playback function 22-1 is implemented in software and stored in the memory 68. However, the present invention is not limited thereto. The Internet radio playback function 22-1 may be implemented in software, hardware, or a combination thereof. The user device 16-1 also includes a communication interface 70 communicatively coupling the user device 16-1 to the network 18 (FIG. 1). Lastly, the user device 16-1 includes a user interface 72, which may include a display, one or more user input devices, one or more speakers, or the like.

Those skilled in the art will recognize improvements and modifications to the preferred embodiments of the present invention. All such improvements and modifications are considered within the scope of the concepts disclosed herein and the claims that follow.

What is claimed is:

1. A method comprising:

obtaining a plurality of Internet radio station programs;

for each Internet radio station program of the plurality of Internet radio station programs, dynamically categorizing the Internet radio station program over time via a control system associated with at least one communication interface to provide a dynamic categorization for the Internet radio station program, wherein dynamically categorizing the Internet radio station program over time comprises:

dynamically identifying topics of the Internet radio station program; and dynamically categorizing the Internet radio station program based on the topics of the Internet radio station program by dynamically mapping the topics to an ontology of content classifiers to identify one or more content classifiers in the ontology related to the topics; and enabling a user to discover an Internet radio station program of interest from the plurality of Internet radio station programs based on the dynamic categorizations for the plurality of Internet radio station programs.

2. The method of claim 1 wherein dynamically categorizing the Internet radio station program comprises:

performing speech-to-text conversion on audio content of the Internet radio station program; and dynamically categorizing the Internet radio station program based on results of the speech-to-text conversion.

3. The method of claim 1 wherein dynamically categorizing the Internet radio station program comprises:

performing speech-to-text conversion and natural language processing on audio content of the Internet radio station program; and dynamically categorizing the Internet radio station program based on results of the speech-to-text conversion and natural language processing.

4. The method of claim 1 further comprising generating a bookmark for each of the topics.

5. The method of claim 1 wherein dynamically categorizing the Internet radio station program based on the topics further comprises dynamically scoring the one or more content classifiers.

6. The method of claim 5 wherein scoring the one or more content classifiers comprises scoring each content classifier of the one or more content classifiers based on at least one of a group consisting of: relevance of one or more of the topics mapped to the content classifier, relative importance of the content classifier in the ontology, and frequency of occurrence of the one or more topics mapped to the content classifier.

7. The method of claim 1 wherein dynamically categorizing the Internet radio station program comprises:

identifying one or more first topics of the Internet radio station program based on an analysis of a first portion of audio content of the Internet radio station program corresponding to a first time segment of the Internet radio station program;

categorizing the Internet radio station program based on the one or more first topics;

identifying one or more second topics of the Internet radio station program based on an analysis of a second portion of the audio content of the Internet radio station program corresponding to a second time segment of the Internet radio station program that is subsequent to the first time segment of the Internet radio station program; and further categorizing the Internet radio station program based on the one or more second topics of the Internet radio station program.

8. The method of claim 7 wherein dynamically categorizing the Internet radio station program comprises, for each additional portion of a plurality of additional portions of the audio content of the Internet radio station program corresponding to a plurality of additional time segments of the Internet radio station program:

identifying one or more additional topics of the Internet radio station program based on an analysis of the additional portion of the audio content of the Internet radio station program; and further categorizing the Internet radio station program based on the one or more additional topics of the Internet radio station program.

9. The method of claim 1 wherein obtaining the plurality of Internet radio station programs comprises, for at least one Internet radio station program of the plurality of radio station programs, subscribing to a corresponding audio stream.

10. The method of claim 9 wherein obtaining the plurality of Internet radio station programs further comprises buffering audio content of each of the plurality of Internet radio station programs, and for each Internet radio station program of the plurality of Internet radio station programs, dynamically categorizing the Internet radio station program over time comprises dynamically categorizing the Internet radio station program based on the buffered audio content of the Internet radio station program.

11. The method of claim 1 wherein obtaining the plurality of Internet radio station programs comprises, for at least one Internet radio station program of the plurality of Internet radio station programs, downloading the at least one Internet radio station program.

12. A non-transitory computer readable medium storing software for instructing a computing system to:

obtain a plurality of Internet radio station programs;

for each Internet radio station program of the plurality of Internet radio station programs, dynamically categorize the Internet radio station program over time to provide a dynamic categorization for the Internet radio station program, wherein dynamically categorizing the Internet radio station program over time comprises:

dynamically identifying topics of the Internet radio station program; and dynamically categorizing the Internet radio station program based on the topics of the Internet radio station program by dynamically mapping the topics to an ontology of content classifiers to identify one or more content classifiers in the ontology related to the topics; and enable a user to discover an Internet radio station program of interest from the plurality of Internet radio station programs based on the dynamic categorizations for the plurality of Internet radio station programs.

13. The non-transitory computer readable medium of claim 12 wherein in order to dynamically categorize the Internet radio station program, the software is further adapted to instruct the computing system to:

perform speech-to-text conversion on audio content of the Internet radio station program; and dynamically categorize the Internet radio station program based on results of the speech-to-text conversion.

14. The non-transitory computer readable medium of claim 12 wherein in order to dynamically categorize the Internet radio station program, the software is further adapted to instruct the computing system to:

perform speech-to-text conversion and natural language processing on audio content of the Internet radio station program; and dynamically categorize the Internet radio station program based on results of the speech-to-text conversion and natural language processing.

15. The non-transitory computer readable medium of claim 12 wherein in order to dynamically categorize the Internet radio station program, the software is further adapted to instruct the computing system to:

identify one or more first topics of the Internet radio station program based on an analysis of a first portion of audio content of the Internet radio station program corresponding to a first time segment of the Internet radio station program;

categorize the Internet radio station program based on the one or more first topics;

identify one or more second topics of the Internet radio station program based on an analysis of a second portion of the audio content of the Internet radio station program corresponding to a second time segment of the Internet radio station program that is subsequent to the first time segment of the Internet radio station program; and further categorize the Internet radio station program based on the one or more second topics of the Internet radio station program.

16. The non-transitory computer readable medium of claim 15 wherein in order to dynamically categorize the Internet radio station program, the software is further adapted to instruct the computing system to, for each additional portion of a plurality of additional portions of the audio content of the Internet radio station program corresponding to a plurality of additional time segments of the Internet radio station program:

identify one or more additional topics of the Internet radio station program based on an analysis of the additional portion of the audio content of the Internet radio station program; and further categorize the Internet radio station program based on the one or more additional topics of the Internet radio station program.

17. A system comprising:

at least one communication interface communicatively coupling the system to one or more Internet radio station providers and a user device; and a control system associated with the at least one communication interface and adapted to:

obtain a plurality of Internet radio station programs from the one or more Internet radio station providers via the at least one communication interface;

for each Internet radio station program of the plurality of Internet radio station programs, dynamically categorize the Internet radio station program over time to provide a dynamic categorization for the Internet radio station program, wherein dynamically categorizing the Internet radio station program over time comprises:

dynamically identifying topics of the Internet radio station program; and dynamically categorizing the Internet radio station program based on the topics of the Internet radio station program by dynamically mapping the topics to an ontology of content classifiers to identify one or more content classifiers in the ontology related to the topics; and enable a user of the user device to discover an Internet radio station program of interest from the plurality of Internet radio station programs based on the dynamic categorizations for the plurality of Internet radio station programs.

* * * * *